Patented Jan. 9, 1923.

1,441,203

UNITED STATES PATENT OFFICE.

EMILE BINDSCHEDLER, OF PHILADELPHIA, PENNSYLVANIA, AND GEORGE JUER, OF HOPEWELL, VIRGINIA, ASSIGNORS TO TUBIZE ARTIFICIAL SILK COMPANY OF AMERICA, OF WILMINGTON, DELAWARE, A CORPORATION OF DELAWARE.

PROCESS OF MANUFACTURING ARTIFICIAL SILK AND OTHER PRODUCTS FROM NITROCELLULOSE.

No Drawing.   Application filed November 19, 1920.   Serial No. 425,048.

*To all whom it may concern:*

Be it known that we, EMILE BINDSCHEDLER, a citizen of the Republic of Switzerland, and resident of Philadelphia, in the county of Philadelphia, in the State of Pennsylvania, and GEORGE JUER, recently a subject of the former Austro-Hungarian Empire, and now a resident of Hopewell, in the county of Prince George, in the State of Virginia, have invented certain new and useful Improvements in Processes of Manufacturing Artificial Silk and Other Products from Nitrocellulose, of which the following is a true and exact description.

Our invention relates to the manufacture of articles from nitrocellulose and particularly to the production of artificial silk. Heretofore it has been known that acetone and its homologues are solvents of nitrocellulose and that its or their use as such would be advantageous from the point of view of the comparatively easy and large percentage of their recovery from admixture with air, as compared with other solvents, the large losses of which more than offset their relative cheapness. It has been found, however, that acetone as heretofore attempted to be used, results in a cloudiness or opacity in the finished product made from the acetone collodion and, particularly, it is found that artificial silk so made is friable and without lustre.

The object of our invention is to provide a method of using acetone as a solvent for nitrocellulose and for recovering the nitrocellulose from solution after manufacture which will produce a lustrous and strong filament or other product, and we accomplish this—first, by dehydrating nitrocellulose hydrate, preferably by treating it with ethyl alcohol which substance need not be eliminated from the treated nitrocellulose before it is brought into solution; second, we treat the dehydrated nitrocellulose with dry acetone or its homologues to form an acetone collodion; third, we give the acetone collodion the desired form of the finished product by well known processes; in the manufacture of artificial silk, by forcing it through spinnerets; lastly, we extract the acetone solvent from the product by evaporation in warm dry air containing 50% or less moisture and heated to from 25° to 40° C. The acetone can afterwards be denitrated, if desired, by well known methods. The use of the dry or dehydrated nitrocellulose and of the dry acetone avoids, we have found, the detrimental effect of acetone on nitrocellulose observable in the methods of use heretofore tried, and while an improved product will be obtained with almost any process for removing the solvent, it is best that it should be removed under conditions which will avoid the hydration of the nitrocellulose or acetone during the extraction of the solvent. Therefore we extract the solvent in the manufacture of artificial silk by passing the filament as formed through a current of warm dry air which will carry off the solvent without hydration and from which a very full recovery of acetone can be made by well known methods; for instance, by passing the solvents in admixture with air through a series of towers into which water is sprayed in the familiar counter current method.

Instead of using acetone its well known homologues can be used, such for instance, as acetone oils, methyl acetone, etc. and the solvent can be made up of mixtures of these or of mixtures of acetone or its homologues with other solvents of nitrocellulose such as ethyl alcohol.

Having now described our invention, what we claim as new and desire to secure by Letters Patent, is:

1. The method of manufacturing clear, unclouded products from nitrocellulose which consists in dehydrating nitrocellulose hydrate by treating it with ethyl alcohol, dissolving it, while still containing adhering ethyl alcohol, in a solvent made up in whole or in part of dry acetone or its homologues, giving to the collodion thus obtained the desired form and finally extracting the solvent by evaporation in warm dry air containing not to exceed fifty percent moisture.

2. The method of manufacturing artificial silk filaments from nitrocellulose which consists in dehydrating nitrocellulose hydrate by treating it with ethyl alcohol, dissolving it, while still containing adhering ethyl alcohol, in a solvent made up in whole or in part of dry acetone or its homologues, giving to the collodion thus obtained the desired form and finally extracting the solvent by evaporation in warm dry air containing not to exceed fifty per cent moisture.

EMILE BINDSCHEDLER.
GEORGE JUER.